United States Patent [19]

Johansson

[11] 4,256,701
[45] Mar. 17, 1981

[54] PRESSURE VESSEL WITH HATCH

[76] Inventor: Arne I. Johansson, Ängsvägen 7, S-840 70 Hammarstrand, Sweden

[21] Appl. No.: 28,921

[22] Filed: Apr. 10, 1979

[51] Int. Cl.³ .......................... B01J 3/03; F16J 12/00
[52] U.S. Cl. .................................. 422/242; 49/210; 49/211; 49/225; 422/295
[58] Field of Search .............. 422/208, 242, 295, 310; 49/210, 211, 221, 223, 225

[56] References Cited

U.S. PATENT DOCUMENTS

| | | | |
|---|---|---|---|
| 2,157,678 | 5/1939 | Schielke | 49/221 |
| 2,552,356 | 5/1951 | Weigele | 49/210 |
| 3,293,801 | 12/1966 | Henning | 49/221 |
| 3,318,048 | 5/1967 | Odend'Hal | 49/223 |
| 3,386,206 | 6/1968 | Loveless | 49/221 |

FOREIGN PATENT DOCUMENTS 2140880 2/1973 Fed. Rep. of Germany .
1150102 4/1969 United Kingdom .

*Primary Examiner*—Bradley Garris
*Attorney, Agent, or Firm*—Young & Thompson

[57] ABSTRACT

A hatch intended for an autoclave or a similar pressure vessel for movement in two directions at an angle to each other provided with a plurality of eccentrically mounted members. These members are joined to each other for common pivotal movements between two end positions in planes at an angle to the plane of the hatch, are in engagement with a guide in front of the hatch and extending to one side of the pressure vessel opening, are at one of their pivotal end positions reciprocably displaceable together with the hatch while carrying it in said guide, and are at the other of their pivotal end positions engageable against the hatch with support in the guide for inserting the hatch into and locking the hatch against the pressure vessel opening and similarly with support in the guide displacing the hatch reciprocally in its direction at least substantially coinciding with the geometrical axis of the pressure vessel opening during pivotal movements of the eccentric members between said both pivotal end positions.

4 Claims, 3 Drawing Figures

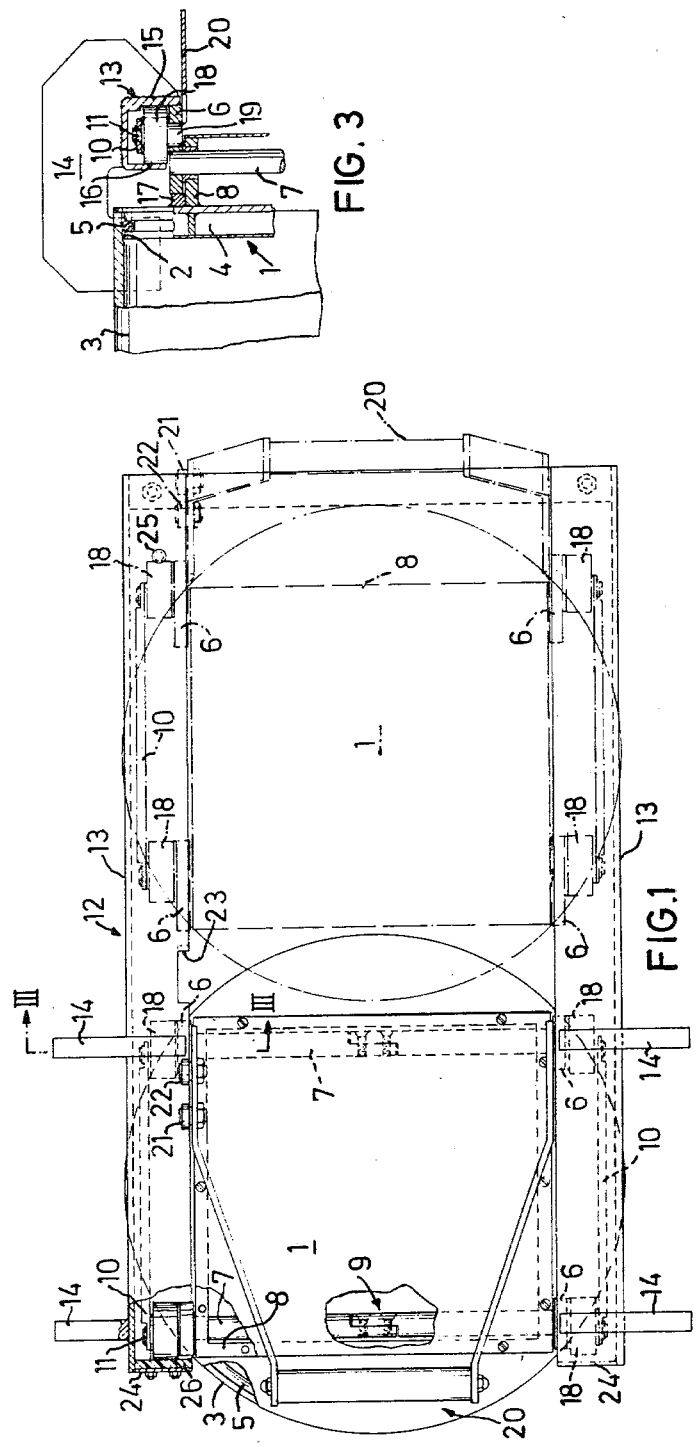

PRESSURE VESSEL WITH HATCH

Doors intended for autoclaves and similar pressure vessels are usually provided with hinges and are thus reciprocably swingable in relation to the pressure vessel opening. They are often pressed against the latter and locked by radial locking bolts arranged in the door or hatch, the inner ends of the bolts being linked with a sleeve movable in the axial direction of the door, this sleeve being in screwed engagement with a spindle provided with a wheel, in the center of the door. When the spindle is rotated in one direction the sleeve travels inwardly thereon to displace the locking bolts radially outwards into engagement with fixed bolt stops around the pressure vessel opening. Continued rotation of the spindle in the same direction gives the door gradually increased bearing pressure, as the bolts with their continuously increasing heights are thrust into the bolt stops. Rotation of the spindle in the opposite directions results in a gradually decreased bearing pressure, and finally allows opening the door after the bolts have been taken out of their engagement with the fixed bolt stops around the pressure vessel opening.

Due to their hinged and common bearing and locking systems, the known doors for autoclaves and similar pressure vessels are burdened with several considerable disadvantages, however. The swingable door namely demands too great a space for its swinging movements, and is often an obstacle in its open position, in which it offers the risk of injury by burns especially when emptying and charging the autoclave. Furthermore, the sealings required between the known doors and the pressure vessel openings are so heavily compressed that they are unnecessarily quickly worn and must be changed, which often requires the efforts of a tradesman, since conventional sealing rings are quite often provided with complicated cross-sectional shapes with associated difficult fixing procedures.

Another type of door is indeed known from the German published specification No. 2,140,880. This door is movable in two sequential and mutual, at least substantially perpendicular directions, of which one is at least substantially coincidental with the geometrical axis of the opening, and the other at least substantially lateral of the opening. Even if this provides a reduced space requirement for the door movements, this known door does not solve the problems so far present in autoclaves and similar pressure vessels. The door or hatch in question is namely intended for vacuum vessels, and as a result of the different sealing and locking problems is not directly suitable for autoclaves and other pressure vessels, which contrary to vacuum vessels work with excess pressure instead of negative pressure.

The present invention has therefore the object of providing a new and improved door for autoclaves and similar pressure vessels, which does not have the disadvantages of the known doors, is considerably easier to open and close than said doors and is furthermore usable with sealings in the form of O-rings which can easily be changed by a layman when required.

To achieve this object, the invention is based on the last-mentioned known hatch and proposes that this, to be movable in the two mutually perpendicular directions is provided with a plurality of eccentrically mounted members, which are joined to each other for common pivotal movements between two end positions in planes inclined to the plane of the hatch, are in engagement with guiding means extending to one side of the pressure vessel opening and in front of the hatch, are at one end of their pivotal end positions reciprocably displaceable together with the hatch while carrying the hatch in said guide means, and are at the other end of their pivotal end positions engageable against the hatch with support in the guide means for inserting and locking the hatch against the pressure vessel opening, similarly with support in the guide means displacing the hatch reciprocally in its direction at least substantially coinciding with the geometrical axis of the pressure vessel opening, during their pivotal movements between said both pivotal end positions. In trials carried out, such a hatch made in accordance with the invention has been found to fulfill the object forming the basis of the invention and furthermore to be simple and functionally reliable.

The eccentrically mounted members can consist of cam plates which are non-rotatably joined to shafts in turn rotatably mounted in a frame incorporated in the hatch. A simple and functionally reliable structure is hereby achieved, while the hatch can be given suitable stiffness for the purpose at the same time.

The guide means for a hatch in accordance with the invention can be formed per se in several different ways, but one embodiment found to be simple and practical consists of two elongate, spaced, parallel U-sections, attached by brackets or the like to the autoclave or pressure vessel, and with their flanges directed opposingly to form guides for the eccentrically mounted members.

In order to make the hatch according to the invention run easily in the guide means, the eccentrically mounted members or cam plates are each suitably provided with a roller mounted for rotation, which in one pivotal end position of the members or plates constitutes a running wheel in the guide means, and in the vicinity of the second pivotal end position constitutes a cam surface of the members or plates. By suitable selection of diameter and shaft placing, the rollers can be unloaded in the locked position of the hatch, so that the excess pressure prevailing in the pressure vessel does not act on them but will be instead taken up by the eccentrically mounted members in the form of cam plates, which, for this purpose, are in their locking end position of the hatch, taken somewhat past a dead point in engaging contact with the guide means.

For easy operation with one hand, the hatch in accordance with the invention is arranged with at least one, but preferably two, of the eccentrically mounted members connected to each other for common pivotal movements rigidly connected to a lever-like handle on the outside of the hatch, for enabling opening, closing and locking the hatch to be carried out with separate simple sweeping movements.

The invention will now be described while referring to the accompanying drawing, which shows an embodiment of a hatch made in accordance with the invention and intended for the charging opening of an autoclave.

FIG. 1 on the drawing shows in full lines a partially sectioned view of the hatch seen from the front, in its closed and locked position in the charging opening of the autoclave, and by chain-dotted lines the hatch in its open position, exposing the charging opening, while FIG. 2 shows the hatch with full and chain-dotted lines, respectively, seen from above and in the same positions as in FIG. 1, and finally FIG. 3 shows a section along the line III—III in FIG. 1 through a part of the operating mechanism of the hatch.

The embodiment of a hatch 1 in accordance with the invention, shown on the drawing, is formed for lockably and sealingly closing a charging opening 2 at one end of a cylindrical pressure vessel 3 for autoclaves. Even if the hatch shown here is provided with a portion 4 projecting into the pressure vessel opening, about which portion there is a groove for an O-ring 5, sealing the hatch 1 against the periphery of the pressure vessel opening 2 without being affected by the bearing pressure of the hatch against the opening, it is understood that a hatch formed in accordance with the invention can also be formed to coact with an optionally formed sealing ring which is mounted either on the hatch itself or on a surface about the pressure vessel opening facing towards the hatch, that in contra-distinction to what is the case in the embodiment of the hatch shown here it will be directly affected by the bearing pressure of the hatch against the opening.

To be movable between the locked position in which it seals the pressure vessel opening 2, and an open position in which it at least partially exposes the pressure vessel opening to make the interior of the pressure vessel 3 accessible, the hatch 1 in conformity with the invention is movable in two sequential and mutually at least substantially perpendicular directions. One of these coincides at least substantially with the geometrical axis of the pressure vessel opening 2, while the other direction at least generally is lateral to the pressure vessel opening. The pattern of movement according to the invention is obtained by the hatch 1 in that it is provided with a plurality of eccentrically mounted members 6 in the form of cam plates. These are non-rotatably joined to shafts 7, which are rotatably mounted in a frame 8 incorporated in the hatch. In detail, the hatch 1 has four eccentrically mounted members or cam plates 6, connected to each other for carrying out common pivotal movements between two end positions in planes at an angle to the plane of the hatch 1. The mutual connection required for providing the common pivotal movements of the cam plates 6 consists of the cam plates being divided into two pairs mutually parallel in the shown embodiment, in which the plates 6 are situated one above the other and are mutually non-rotatably connected to each other by their associated pivoting shafts 7 which are non-rotatably connected at 9. In their turn, the two parallel cam plate pairs are connected at either end by means of two parallel links 10 pivotally mounted about journalling pins 11 fixed in the cam plates 6 at a distance from the pivoting shafts 7 such that complete copivoting is ensured between both plate pairs.

All the cam plates 6 are mounted suitably distributed about the periphery of the hatch 1, and are formed for engaging coaction with a guide means 12 mounted in front of the hatch. In the guide means 12, extending along one side of the pressure vessel opening 2 and consisting of two elongate spaced parallel U-sections 13 attached by brackets 14 or the like to the autoclave or pressure vessel by their flanges 15,16 which are opposed for forming guides for the eccentrically mounted members or plates 6, the members or plates 6 are at one end of their pivoted end positions, namely that in which the longitudinal axes of the plates are parallel to the longitudinal axes of the U-sections 13, reciprocally displaceable together with the hatch which they thus carry in the guide means. In the second of their pivoted end positions, namely that which is apparent in FIG. 2, in which the longitudinal axes of the cam plates are practically transverse to the longitudinal axes of the U-sections of the guiding means, the cam plates 6 are engageable with support from the flanges 15 of the guide means 12 against the stops 17 on the hatch 1 for locking the hatch against the pressure vessel opening 4. During the pivoting movements between said end positions, the eccentric members or cam plates 6 with support of the guide means flanges 16 situated nearest the opening, displace the hatch 1 reciprocally in its direction of travel at least substantially coinciding with the geometrical axis of the pressure vessel opening 2.

So that the hatch 1 will be as easily movable as possible, the eccentrically mounted members or cam plates 6 are each provided with a roller mounted for rotation, which at the one pivotal end position of the plates constitutes a running wheel in the U-sections 13 of the guide means 12, and in the vicinity of the second pivoted end position constitutes a cam surface on the plates 6 for coaction with the shanks 15,16 incorporated in the U-sections 13 of the guide means. The rollers 18 are suitably ball bearings which are rotatably mounted on the journalling pins 19, which are welded to the cam plates 6 laterally of their pivoting shafts 7. These journalling pins 19 and the journalling pins 11 for the links 10 connecting the cam plate pairs can suitably be made in one piece, whereas the plates however, should be eccentrically situated on the freely projecting ends of the pins 19.

To provide the opening, closing and locking movements to the hatch 1, at least one, but preferably two, of the eccentrically mounted members or cam plates 6 for the common oscillatory movements, is rigidly connected with a lever-like handle 20 co-pivoting therewith. It will be seen from FIG. 3 how this handle 20 can be welded to the cam plates 6 on one of the cam plate pairs. When the handle 20 on the hatch shown in FIG. 1 is swung to the right, the cam plates 6 are caused to leave the position shown to the left in FIG. 2 and in FIG. 3, to assume the position shown with chain-dotted lines to the right of FIGS. 1 and 2. In conjunction therewith, the hatch is released from the pressure vessel and displaced out of its opening and to the right in the guide means 12. All this is consequent on a single sweeping uniform action on the handle 20, which thereby pivots between the portions of its arms which are welded to the cam plates 6, between the U-sections 13 of the guide means 12. The arms of the handle are retained in their guided positions with the help of two guide rollers 21,22, of which one roller 21 bears against the outer flange 15 of the upper U-section 13 and the other 22 bears against the inside of said flange. An opening 23 is arranged in the flange 15 so that the roller 22 can be inserted behind it. The guide roller 22 of the handle 20 goes through this opening in and out of the guide means when the hatch is opened or closed. In its completely open position, the hatch 1 is moved to one side in a way requiring little space and protected against being touched, which is considerably more advantageous than the way of moving the known swinging doors to one side.

When the hatch 1 in accordance with the invention is moved to one side in the position shown in chain-dotted lines to the right in FIG. 1, the O-ring 5 can be changed without difficulty, even by a layman.

So that the hatch will not leave its track in either of the directions of travel in the guiding means 12, simple stop means 24 and 25 are arranged at the ends of the U-sections 13. In the embodiment shown here, the stop means at the ends of the U-sections to the left in the figures consist of end walls welded into the sections, the inner faces of said walls being covered with a soft shock-absorbing material 26, while the stop means 25 at the other end of the sections can quite simply consist of a pin extending between both flanges 15,16.

The invention is not limited to the embodiment example described above and shown on the drawing, but can be modified in many other ways within the scope of the patent claims.

What I claim is:

1. A pressure vessel comprising a hatch movable between a locked position in which it seals an opening in the pressure vessel, and an open position in which it at least partly exposes the pressure vessel opening and makes the interior of the pressure vessel accessible, said hatch being movable in two directions sequential to each other and mutually at least substantially perpendicular, of which one direction substantially coincides with the geometric axis of the pressure vessel opening and the other at least generally extends laterally of the opening, said hatch having for said movement in said two directions a plurality of eccentrically mounted cam members, which are joined to each other for common pivotal movements between two end positions in planes perpendicular to the plane of the hatch, are provided and are in engagement with a guide means in front of the hatch and extending to one side of the pressure vessel opening, are at one of their pivotal end positions reciprocally displaceable laterally of the opening together with the hatch while carrying the hatch in said guide means, are at the other of their pivotal end positions engageable against the hatch with support in the guide means for inserting into and locking the hatch against the pressure vessel opening and for displacing the hatch reciprocally in the direction at least substantially coinciding with the geometrical axis of the pressure vessel opening during their pivotal movements between said both pivotal end positions, and are each provided with a roller mounted eccentrically on them for rotation, which rollers in one pivotal end position of the cam members constitute running wheels in the guide means and in the vicinity of the other pivotal end position constitute cam surfaces on said cam members but are unloaded in the locked position of the hatch by said support of said cam members in the guide means, so that the excess pressure in the vessel does not act on said rollers but is instead taken up by said cam members.

2. A pressure vessel according to claim 1, wherein the eccentrically mounted cam members consist of cam plates which are non-rotatably connected to shafts pivotally mounted in a frame incorporated in the hatch.

3. A pressure vessel according to claim 1, wherein the guide means consists of two elongate spaced parallel U-sections attached by brackets to the pressure vessel, with their flanges opposingly directed to form guides for the eccentrically mounted cam members.

4. A pressure vessel according to claim 1, wherein at least one of the eccentrically mounted cam members connected to each other for common pivotal movements, is furthermore rigidly connected to a lever-like handle pivoting therewith for opening, closing and locking the hatch.

* * * * *